May 12, 1936. S. N. WEINER Re. 19,968

SEAM FOR GARMENTS

Original Filed April 25, 1933

WITNESS:

INVENTOR
SAMUEL N. WEINER.
BY
Ely & Pattison.
ATTORNEYS

Reissued May 12, 1936

Re. 19,968

UNITED STATES PATENT OFFICE 19,968

SEAM FOR GARMENTS

Samuel N. Weiner, Far Rockaway, N. Y.

Original No. 1,950,367, dated March 6, 1934, Serial No. 667,813, April 25, 1933. Application for reissue November 5, 1934, Serial No. 751,633

5 Claims. (Cl. 2—276)

This invention relates to seams for garments and particularly it pertains to a new and improved seam for garments which are formed from relatively light material and constitutes a continuation, in part, of my prior application Serial No. 654,116.

In the fashioning of certain garments, and particularly ladies' undergarments from silk, the garments are formed from several pieces of material, the several pieces being secured together by seams. Due mainly to the direction in which the strains are distributed through the several pieces of fabric which form the garment, great difficulty has been experienced in preventing rupture of the seams. This is particularly true where seams of ordinary types are employed.

It is an object of the invention to provide a new and improved seam which will not rupture under ordinary strains to which the garments are subjected in general use.

A feature of the invention resides in a novel construction whereby two pieces of fabric may be secured together in such a manner that they are free to move relatively to each other in the same plane.

Another feature of the invention resides in a novel construction whereby two pieces of fabric may be secured together in such a manner that their adjacent edges will at all times under normal conditions, maintain positions in which they are spaced relatively to each other.

Still another feature of the invention resides in a novel means for securing two pieces of fabric together with their adjacent edges spaced from each other.

Still another object of the invention resides in a novel construction which will permit of movement of the adjacent edges of the pieces of material in directions both towards and away from each other to relieve the actual attaching seam of strains under ordinary conditions of wear.

Other features of the invention relate to a novel and improved construction hereinafter described and particularly pointed out in the claims, the advantages of which will be readily understood and appreciated by those skilled in the art.

The invention will be clearly understood from the accompanying drawing illustrating the invention in its preferred form and the following detailed description of the construction therein shown.

Figure 1:
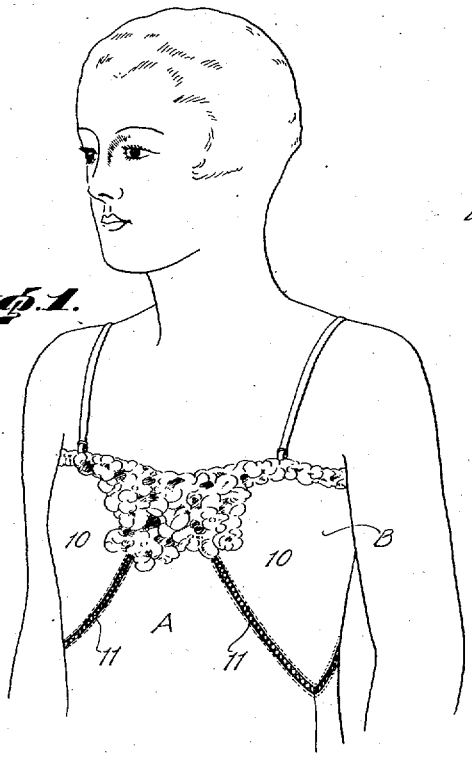
Figure 1 is a perspective view illustrating one type of garment to which the present invention is particularly adapted.

In the accompanying drawing, I have illustrated one form of grament to which a seam constructed in accordance with the present invention is particularly adapted. The garment herein illustrated is of the type commonly known as a slip. It comprises a main body portion A and an upper body portion B. The lower body portion A consists of a plurality of pieces of material and the upper body portion likewise comprises a plurality of pieces of material. The pieces of material in the upper body portion are designated 10 in the drawing and may be cut either on the straight or on the bias. The main body portion and the upper body portion, the latter being composed of the pieces of material 10 are secured together to form the garment by means of seams 11, which in garments of this type are generally angularly disposed.

In building these garments, it is the general practice to secure the fabric of the main body portion to the pieces which form the upper body portion by an ordinary seam. Due mainly to the direction and unequal distribution of strain to which the seams are subjected in use, an ordinary seam readily tears.

The seam to be hereinafter described is particularly adapted for securing the pieces which form the upper body portion to the lower body portion in garments of this character and this is particularly true where the material employed is relatively thin and light, such for example as silk or where the material possesses different characteristics, as for instance by cutting one piece on the straight and cutting the other piece or pieces on the bias.

In the present seam, the pieces of material to be joined are not secured together in overlapped relation as in a common seam, but are, instead, secured together with their adjacent edges appreciably spaced from one another. This construction permits of movement of either piece of material independently of the other in the same plane. The construction which I employ to obtain this result also permits of independent movement of the members in opposite directions, that is to say, towards and away from each other within certain limitations of course, which, however, will be sufficient to compensate for more than ordinary strain, equally distributing the same through the several pieces and thereby preventing rupture of the seam.

Figure 2:
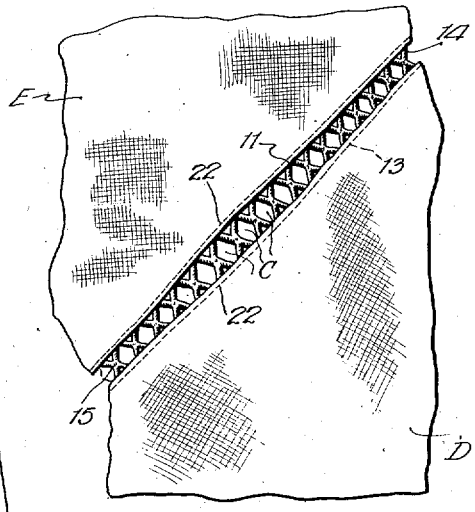
Figure 2 is a fragmentary plan view on an enlarged scale showing one manner in which the seam functions to relieve the fabric of strains.
Figure 3:
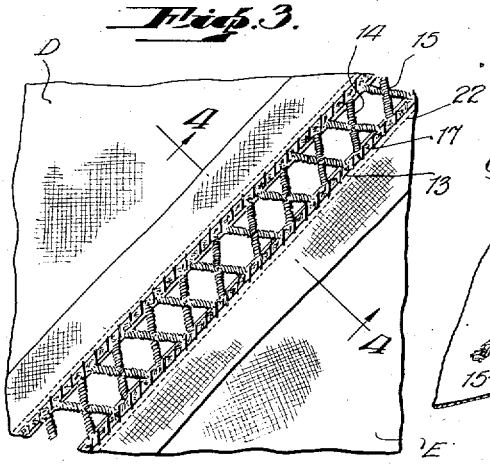
Figure 3 is a view similar to Figure 2, but showing the reverse face of the garment.

In the accompanying drawing I have illustrated one manner by which the aforementioned desirable results may be accomplished and in said drawing the seam consists primarily of a pair of reinforcing elements 13 which extend longitudinally of and parallel with the edges of the pieces of material to be secured together. These reinforcing elements are connected by flexible members 14, which latter are preferably crossed as at 15 and at their point of crossing the flexible members 14 are preferably interlocked one with the other. The flexible members 14 serve to maintain the adjacent edges of the pieces of fabric to be secured together in spaced relation to one another. By reason of the fact that these members are flexible, the piece of material may be moved towards the other, the flexible members 14 giving sufficiently to permit this operation, or one of the pieces of fabric may be moved away from the other as indicated at C in Figure 2, the flexible members 14 also giving to permit of this operation.

Figure 5:
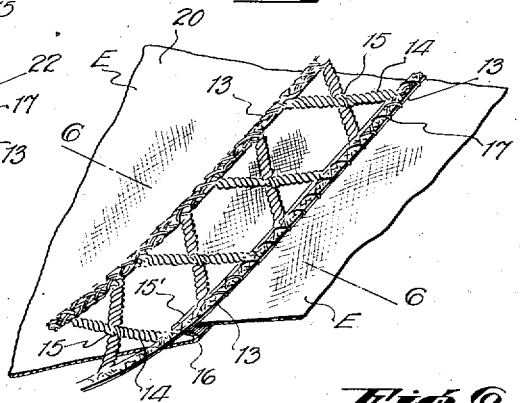
Figure 5 is a fragmentary inverted perspective view illustrating one step in the method of making a seam in accordance with the present invention.
Figure 6:
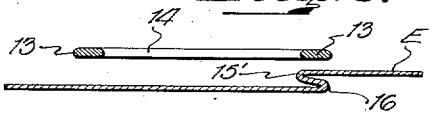
Figure 6 is an inverted detail sectional view taken on the line 6—6 of Figure 5.
Figure 4:
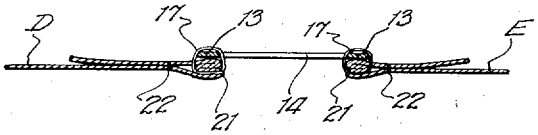
Figure 4 is an inverted transverse sectional view, taken on the line 4—4 of Figure 3.

Referring to Figures 4 to 6 inclusive, I will describe how the two pieces of fabric which I have designated D and E are secured together by my improved seam. In Figure 6 the piece of fabric E is provided with a series of folds indicated by the reference numerals 15' and 16. A reinforcing element 13 is then secured to the folded portion as illustrated in Figure 5 by suitable stitching 17, the stitching 17 extending through two of the folds of said series. After this has been done, the portion of the piece of fabric designated 20 is folded back as at 21 in Figure 4 and is secured to the main portion of the piece of fabric E by a line of stitching 22. This last folding of the material covers and hides the stitching 17 on the outer surface of the garment as will be observed from an inspection of Figures 2 and 4. The piece of fabric D is now attached to the other reinforcing element 13 in the same manner. This construction, as illustrated in Figure 4, maintains the two adjacent edges of the pieces of fabric D and E in spaced relation one to the other.

Referring to Figure 1, it will be noted that if either piece of fabric D or E of the garment is subjected to strain the flexible connecting members 14 will permit of free movement within certain limitations which will be as heretofore stated, sufficient to relieve the lines of stitching 17 and 22 sufficiently to prevent rupture of the garment at these points. This is illustrated at C in Figure 2.

While in the present instance I have shown the flexible connecting members 14 as being crossed and interlocked with each other, it is to be understood that the invention is not to be limited to this specific construction and arrangement since these connecting members may extend straight across the intervening space between the adjacent edges of the two pieces of fabric secured together. I prefer, however, to cross the connecting members, since where they extend straight across the intervening space between the pieces, there is no provision for moving the two members in opposite directions except when they are moved towards each other, the structure not permitting of their being moved away from each other as freely as does the structure where the flexible connecting members are crossed.

In actual practice I have found the foregoing seam and method of making highly satisfactory for undergarments and particularly for ladies' underwear manufactured from relatively thin and light material such as silk and necessarily fragile and unable to withstand strains when the several pieces thereof are connected by seams of ordinary construction.

While the invention has been herein illustrated and described in its preferred forms, it is to be understood that it is not to be limited to the forms described and that it may be carried out in other ways without departing from the spirit thereof.

Having thus described the invention, what is claimed as new and what it is desired to secure by Letters Patent of the United States, is:

1. In a garment including two pieces of material, a seam structure for securing said pieces together, said seam structure comprising outer folds and an intermediate fold extending along those edges of the garment pieces to be secured together, a reinforcing element extending along each of said folded edges, stitching securing the reinforcing element, said stitching passing through said outer folds and surrounding said intermediate fold and flexible spacing elements normally to hold the edges of the pieces in spaced relation, said spacing elements being arranged in pairs with those of each pair crossed and interlocked at their point of crossing.

2. In a garment including two pieces of material, a seam structure for securing the pieces together, said seam structure comprising a series of folds extending along those edges of the garment pieces to be secured together, a reinforcing element extending along each of said folded edges, stitches securing the reinforcing element, said stitching passing through at least two of the folds and another of the folds of the garment covering the stitching at the outer surface of the garment and flexible spacing elements normally to hold the edges of the pieces in spaced relation.

3. In a garment including two pieces of material, one of which is cut on the bias and one on the straight, a seam structure for securing the pieces together, said seam structure comprising a series of folds extending along those edges of the garment pieces to be secured together, a reinforcing element extending along each of said folded edges, stitching securing the reinforcing element, said stitching passing through two of said folds and flexible spacing elements normally to hold the edges of the pieces in spaced relation, said spacing elements being arranged in pairs with those of each pair crossed and interlocked at their point of crossing.

4. In a garment including two pieces of material, one of which pieces is cut on the bias and one on the straight, a seam structure for securing the pieces together comprising a series of folds extending along those edges of the garment pieces to be secured together with the edge of the garment piece being free, a reinforcing element overlying each of said folded edges, stitching securing the reinforcing element, said stitching passing through two of said folds, flexible spacing elements secured to and connecting said reinforcing elements normally to hold the folded edges of the pieces in spaced relation and a separate line of stitching extending parallel with each reinforcing element, said last mentioned line of stitching securing the free edge of its respective garment piece to the rear face of the piece.

5. In a garment including two pieces of material, a seam structure for securing said pieces together, said seam structure comprising folds extending along those edges of the garment pieces to be secured together, a reinforcing element extending along each of said folded edges, stitching securing the reinforcing element, said stitching passing through the folds of said edges, and flexible spacing elements normally to hold the edges of the pieces in spaced relation, said spacing elements being arranged in pairs with those of each pair crossed and interlocked at their point of crossing.

SAMUEL N. WEINER.